United States Patent Office 3,230,180
Patented Jan. 18, 1966

3,230,180
METAL PHTHALOCYANINE CATALYST PREPARATION
John R. Larson, Wood Dale, Ill., assignor to Universal Oil Products Company, Des Plaines, Ill., a corporation of Delaware
No Drawing. Filed Feb. 7, 1963, Ser. No. 256,832
12 Claims. (Cl. 252—431)

This invention relates to a novel method of preparing a metal phthalocyanine catalyst composited with a solid adsorbent carrier material.

Metal phthalocyanines have assumed considerable importance as catalysts, particularly in the treatment of sour petroleum distillates including the cracked, straight run, and natural gasolines, and also naphtha, kerosene, jet fuels, fuel oils, etc. In the treatment of a sour petroleum distillate, mercaptans contained therein are oxidized to disulfides on contact with an oxidizing agent and small amounts of a metal phthalocyanine catalyst dissolved or suspended in aqueous caustic solution. The metal phthalocyanine catalyst is soluble in the aqueous caustic solution in only small concentrations but substantially totally insoluble in the petroleum distillate. As a result, the metal phthalocyanine catalyst is removed from the treating zone in a commingled state with the aqueous caustic phase and is not dissolved in and carried away by the petroleum distillate. It has been observed that supported metal phthalocyanine catalysts retain their activity for a substantial period beyond that of the unsupported metal phthalocyanines and that the activity of the supported metal phthalocyanines is considerably less dependent on a large aqueous caustic phase during the treating process.

In the preparation of supported metal phthalocyanine catalysts, it is generally preferred to composite as much of the metal phthalocyanine with the support as will form a stable composite. However, due to the extreme insolubility of most metal phthalocyanines, it is difficult to achieve a uniform distribution of any substantial quantity of the metal phthalocyanine in excess of about 1% on a supporting material by conventional methods, for example, by contacting the supporting material with an aqueous or caustic solution of the metal phthalocyanine and adsorbing the metal phthalocyanine on the supporting material. It is therefore an object of this invention to present a novel method of preparing a supported metal phthalocyanine catalyst. It is a further object to present a novel method of preparing a metal phthalocyanine catalyst in uniform distribution on a supporting material. It is another object of the present invention to present a novel method of compositing a metal phthalocyanine with a supporting material in an amount up to and considerably in excess of that obtainable by conventional methods of preparation.

In one of its broad aspects the present invention embodies a method of compositing a metal phthalocyanine with a solid adsorbent carrier material, which method comprises heating phthalonitrile at a temperature of from about 175° C. to about 325° C. in contact with a metalliferous reactant composited with said solid adsorbent carrier material, said metalliferous reactant being selected from the group consisting of the metal component of the desired metal phthalocyanine, a salt of said metal, and an oxide of said metal.

Another embodiment relates to a method of compositing a metal phthalocyanine with a solid adsorbent carrier material, which method comprises heating phthalonitrile at a temperature of from about 175° C. to about 325° C. in contact with an oxide of the metal component of the desired metal phthalocyanine composited with said solid adsorbent carrier material.

A further embodiment of this invention concerns a method of compositing a metal phthalocyanine with a charcoal carrier material which comprises heating phthalonitrile at a temperature of from about 175° C. to about 325° C. in contact with an oxide of the metal component of the desired metal phthalocyanine composited with said charcoal carrier material.

Another embodiment of the present invention relates to a method of compositing a metal phthalocyanine with a refractory metal oxide carrier material, which method comprises heating phthalonitrile at a temperature of from about 175° C. to about 325° C. in contact with an oxide of the metal component of the desired metal phthalocyanine composited with said refractory metal oxide carrier material.

Other objects and embodiments of the present invention will become apparent in the following detailed specification.

The method of this invention is applicable to the preparation of a composite comprising a solid adsorbent carrier material and any of the various metal phthalocyanines, for example, iron phthalocyanine, cobalt phthalocyanine, copper phthalocyanine, vanadium phthalocyanine, manganese phthalocyanine, magnesium phthalocyanine, zinc phthalocyanine, titanium phthalocyanine, hafnium phthalocyanine, thorium phthalocyanine, tin phthalocyanine, lead phthalocyanine, columbium phthalocyanine, tantalum phthalocyanine, antimony phthalocyanine, bismuth phthalocyanine, chromium phthalocyanine, molybdenum phthalocyanine, nickel phthalocyanine, palladium phthalocyanine, platinum phthalocyanine, silver phthalocyanine, mercury phthalocyanine, and the like.

The present invention is applicable to the preparation of a metal phthalocyanine composited with any of the various and well-known adsorbent solid materials generally utilized as catalyst supports. Said adsorbent materials include the various charcoals produced by the destructive distillation of wood, peat, lignite, nut shells, bones, and other carbonaceous matter, and preferably such charcoals as have been heat treated, or chemically treated, or both, to form a highly porous particle structure of increased adsorbent capacity, and generally defined as activated carbon. Said adsorbent materials also include the naturally occurring clays and silicates, for example, diatomaceous earth, fuller's earth, kieselguhr, attapulgus clay, feldspar, montmorillonite, halloysite, kaolin, and the like, and also the naturally occurring or synthetically prepared refractory metal oxides such as alumina, silica, zirconia, thoria, boria, etc., or combinations thereof like silica-alumina, silica-zirconia, alumina-zirconia, etc. In any case, a solid adsorbent material which has been activated by heat treatment, chemical treatment, or otherwise, to realize optimum porosity and adsorbent capacity of the same, is preferred.

Any particular solid adsorbent material is selected with regard to its stability under conditions of its intended use. For example, in the treatment of a sour petroleum distillate hereinabove described, the solid adsorbent carrier material should be insoluble in, and otherwise inert to, the aqueous caustic solution and the petroleum distillate at conditions existing in the treating zone. In the latter case, charcoal, and particularly activated carbon, is preferred because of its capacity for metal phthalocyanine and because of its stability under treating conditions. However, it should be observed that the method of this invention is also applicable to the preparation of metal phthalocyanines composited with any of the other well-known solid adsorbent carrier materials, particularly the refractory metal oxides. In one of the preferred embodiments of this invention the solid adsorbent carrier material is alumina.

In accordance with the method of this invention, phthalonitrile is heated at a temperature of from about 175° C. to about 325° C. in contact with a metalliferous reactant composited with a solid adsorbent carrier material hereinabove described. A metalliferous reactant includes a salt or an oxide of the metal component of the desired metal phthalocyanine, or said metalliferous reactant can be the metal itself. The metalliferous reactant can be composited with the carrier material in any conventional or otherwise convenient manner. One suitable method comprises preparing a solution, usually an aqueous solution, of a soluble salt of the metal component of the desired metal phthalocyanine and adsorbing the salt on a selected carrier material by soaking, dipping, or otherwise immersing or contacting the same with said solution. Suitable soluble metal salts, corresponding to the desired metal phthalocyanine, include ferrous formate, ferrous acetate, ferric chloride, ferrous chloride, ferric bromide, ferrous bromide, ferrous iodide, ferric nitrate, ferrous nitrate, ferrous sulfate, cobalt formate, cobalt acetate, cobaltous chlorate, cobaltous bromate, cobaltous iodate, cobaltous chloride, cobaltous bromide, cobaltous fluoride, cobaltous iodide, cobaltous nitrate, cobaltous sulfate, cupric chloride, cupric bromide, cupric chlorate, cupric bromate, cupric nitrate, cupric sulfate, vanadium tribromide, vanadium trifluoride, vanadyl sulfate, ammonium vanadate, magnesium formate, magnesium acetate, magnesium chloride, magnesium bromide, magnesium iodide, magnesium nitrate, magnesium sulfate, zinc formate, zinc acetate, zinc chloride, zinc chlorate, zinc bromide, zinc bromate, zinc nitrate, zinc sulfate, titanium trichloride, titanium tribromide, stannous chloride, stannic chloride, stannous bromide, stannic sulfate, antimony trichloride, antimony trifluoride, antimony triiodide, chromous chloride, chromic chloride, chromic bromide, chromic iodide, chromic nitrate, chromic sulfate, ammonium molybdate, molybdenum tetrachloride, nickel formate, nickel acetate, nickel chloride, nickel bromide, nickel iodide, nickel nitrate, nickel sulfate, palladium chloride, palladium sulfate, chloropalladic acid, platinum chloride, platinum sulfate, chloroplatinic acid, silver nitrate, etc.

In a preferred embodiment of this invention the metalliferous reactant is an oxide of the metal component of the desired metal phthalocyanine. The metal oxide can be composited with the carrier material by calcination of a composite of a metal salt and a carrier material which may be prepared in the above-described manner. The salt impregnation carrier material is subjected to calcination at a temperature of at least 200° C., and generally within the range of from about 300° C. to about 600° C. Calcination is effected in the presence of air or other oxidizing media to yield the desired metal oxide composited with the carrier material.

As has been stated, the metalliferous reactant may be the metal component of the desired metal phthalocyanine, for example, iron, cobalt, copper, vanadium, etc. The elemental metal is preferably composited with the selected carrier material in a finely divided state. This is readily accomplished by subjecting the above-mentioned salt impregnated carrier material to calcination in the presence of hydrogen or other reducing atmosphere.

Regardless of the particular metalliferous reactant or the method of compositing the same with the solid adsorbent carrier material, the resulting composite is heated with phthalonitrile at a temperature of from about 175° C. to about 325° C. The phthalonitrile should be present in at least a stoichiometric amount with relation to the metalliferous reactant. It is preferred to use an excess of phthalonitrile, which excess may comprise a mole ratio of 10:1 or more. It is considered within the scope of this invention to utilize certain precursors of phthalonitrile rather than phthalonitrile per se, for example, urea and phthalic acid, or urea and phthalic anhydride. The phthalonitrile can be utilized with or without a solvent, although the latter is preferred. An inert organic solvent such as nitrobenzene, kerosene, naphthalene, chloronaphthalene, etc., is suitable and particularly trichlorobenzene, o-dichlorobenzene, quinoline, pyridine, and the like. In some cases it may be desirable to include catalytic amounts of cobalt chloride, or ammonium molybdate, or other known catalysts for the preparation of metal phthalocyanines. In any case, the amount of the desired metal phthalocyanine which can be composited with the selected carrier material is limited only by the capacity of the carrier material for the metalliferous reactant initially composited therewith.

One of the preferred embodiments of this invention relates to a method of compositing copper phthalocyanine with alumina by heating phthalonitrile at a temperature of from about 175° C. to about 325° C. in contact with copper oxide composited with alumina.

Another preferred embodiment is in a method of compositing cobalt phthalocyanine with activated carbon which method comprises heating phthalonitrile at a temperature of from about 175° C. to about 325° C. in contact with cobalt oxide composited with said carbon.

And still another preferred embodiment of the present invention relates to a method of compositing vanadium phthalocyanine with activated carbon by heating phthalonitrile at a temperature of from about 175° C. to about 325° C. in contact with vanadium oxide, composited with said carbon.

In some instances, the metal phthalocyanine, composited with the solid adsorbent support, is preferably utilized as a derivative of said metal phthalocyanine. A particularly preferred derivative is the sulfonated derivative. The metal phthalocyanine composited with an adsorbent carrier material in accordance with the method of this invention, is readily converted to the sulfonated derivative, for example, by the action of fuming sulfuric acid thereon. Other desirable derivatives include particularly the carboxylated derivative which may be prepared, for example, by the action of trichloroacetic acid on the composite of this invention, or by the action of phosgene and aluminum chloride. In the latter case, the acid chloride is formed and may be converted to the desired carboxylate derivative by conventional hydrolysis.

The following examples are introduced in illustration of the specific embodiments of this invention and are not intended as a limitation on the generally broad scope of this invention as set out in the appended claims.

*Example I*

Copper phthalocyanine was composited with alumina by immersing about 50 grams of ⅛ inch pellets, comprising about 8.0 wt. percent copper oxide composited with alumina, in 50 grams of phthalonitrile at a temperature of approximately 180° C. The mixture was thus heated for a period of about 30 minutes and in a nitrogen atmosphere. The pellets were thereafter washed with hot ethanol and dried at a temperature of 150° C. The washed and dried pellets were found to comprise about 8.5 wt. percent copper phthalocyanine composited with alumina.

*Example II*

Cobalt phthalocyanine is composited with alumina by immersing about 50 grams of pellets, comprising alumina and about 10 wt. percent cobaltous oxide, in about 50 grams of phthalonitrile at a temperature of about 275–285° C. The mixture is heated at this temperature for a period of 30 minutes in a nitrogen atmosphere. The pellets are thereafter washed with hot ethanol and dried in a temperature of about 150° C. The washed and dried pellets comprise about 10 wt. percent cobalt phthalocyanine composited with alumina.

*Example III*

In the preparation of vanadium phthalocyanine composited with alumina, about 50 grams of pellets comprising about 10% vanadium oxide on alumina are heated with about 50 grams of phthalonitrile at a temperature of about 180° C. and in a nitrogen atmosphere. After about 30 minutes the pellets are recovered, washed with hot ethanol, and dried. The washed and dried pellets comprise about 10% vanadium phthalocyanine composited with alumina.

Example IV 50 grams of ⅛ inch alumina pellets containing about 8.0 wt. percent copper oxide was heated with a solution comprising 50 grams of phthalonitrile in 200 grams of quinoline. The mixture was heated at reflux temperature in a nitrogen atmosphere. After a period of about 2.3 hours had elapsed, the pellets were recovered by filtration, washed with hot ethanol, and dried at 150° C. The washed and dried pellets were found to comprise 6.5% copper phthalocyanine composited with alumina.

Example V

A composite of cobalt phthalocyanine and activated carbon is prepared as follows: About 50 grams of phthalonitrile is dissolved in about 200 grams of quinoline. 50 grams of activated carbon granules, containing about 10 wt. percent cobaltous oxide deposited thereon, are added to the solution and the resulting mixture heated at reflux temperature. After about 30 minutes, the mixture is filtered. The granular material is washed with hot ethanol and thereafter dried at approximately 150° C. The washed and dried granules comprise about 10 wt. percent cobalt phthalocyanine composited with activated carbon.

Example VI

A composite of vanadium phthalocyanine and activated carbon is prepared as follows: 50 grams of phthalonitrile is heated at a temperature of about 180° C. 50 grams of activated carbon granules, containing about 10 wt. percent vanadium oxide deposited thereon, are added to the phthalonitrile and the resulting mixture heated at the aforesaid temperature for about 30 minutes. The mixture is thereafter filtered while hot. The granular material is washed with hot ethanol and dried at approximately 150° C. The washed and dried granules comprise about 10 wt. percent vanadium phthalocyanine composited with activated carbon.

I claim as my invention:

1. A method for the preparation of a supported metal phthalocyanine catalyst which comprises compositing a reactant supplying the metal of said metal phthalocyanine with a solid adsorbent carrier and heating the resultant composite with phthalonitrile at a temperature of from about 175° C. to about 325° C., said phthalonitrile and reactant being in sufficient amounts to composite substantially in excess of 1% by weight of metal phthalocyanine with said carrier, and said reactant being reactable with phthalonitrile at said temperature to form said metal phthalocyanine.

2. The method of claim 1 further characterized in that said reactant is a metal oxide.

3. The method of claim 1 further characterized in that said reactant is a metal salt.

4. A method for the preparation of a supported metal phthalocyanine catalyst which comprises compositing with a solid adsorbent carrier an oxide of a metal selected from the group consisting of copper, cobalt and vanadium and heating the resultant composite with phthalonitrile at a temperature of from about 175° C. to about 325° C., said phthalonitrile and oxide being in sufficient amounts to composite substantially in excess of 1% by weight of metal phthalocyanine with said carrier.

5. The method of claim 4 further characterized in that said carrier is charcoal.

6. The method of claim 4 further characterized in that said carrier is a refractory metal oxide.

7. The method of claim 4 further characterized in that said carrier is alumina.

8. A method of compositing copper phthalocyanine with activated alumina, which method comprises heating phthalonitrile at a temperature of from about 175° C. to about 325° C. in contact with copper oxide composited with said alumina, said phthalonitrile and copper oxide being in sufficient amount to composite substantially in excess of 1% by weight of copper phthalocyanine with said alumina.

9. A method compositing cobalt phthalocyanine with activated alumina, which method comprises heating phthalonitrile at a temperature of from about 175° C. to about 325° C. in contact with cobalt oxide composited with said alumina, said phthalonitrile and cobalt oxide being in sufficient amount to composite substantially in excess of 1% by weight of cobalt phthalocyanine with said alumina.

10. A method of compositing vanadium phthalocyanine with activated alumina, which method comprises heating phthalonitrile at a temperature of from about 175° C. to about 325° C. in contact with vanadium oxide composited with said alumina, said phthalonitrile and vanadium oxide being in sufficient amount to composite substantially in excess of 1% by weight of vanadium phthalocyanine with said alumina.

11. A method of compositing cobalt phthalocyanine with activated charcoal, which method comprises heating phthalonitrile at a temperature of from about 175° C. to about 325° C. in contact with cobalt oxide composited with said charcoal, said phthalonitrile and cobalt oxide being in sufficient amount to composite substantially in excess of 1% by weight of cobalt phthalocyanine with said charcoal.

12. A method of compositing vanadium phthalocyanine with activated charcoal, which method comprises heating phthalonitrile at a temperature of from about 175° C. to about 325° C. in contact with vanadium oxide composited with said charcoal, said phthalonitrile and vanadium oxide being in sufficient amount to composite substantially in excess of 1% by weight of vanadium phthalocyanine with said charcoal.

References Cited by the Examiner

UNITED STATES PATENTS

| | | | |
|---|---|---|---|
| 2,939,844 | 6/1960 | Ellinger | 252—428 |
| 2,965,686 | 12/1960 | Prill | 252—429 |
| 2,988,517 | 6/1961 | Bristol | 252—428 |
| 3,031,514 | 4/1962 | Kosmin | 252—429 |
| 3,108,081 | 10/1963 | Gleim et al. | 252—428 |

OTHER REFERENCES

Linstead et al.: "Jour. Chem. Soc.," London, 1934, pp. 1022–39.

Barrett et al.: ibid, 1936, pp. 1719–36.

TOBIAS E. LEVOW, *Primary Examiner.*

SAMUEL H. BLECH, *Examiner.*